United States Patent
Waldron et al.

(10) Patent No.: US 6,227,433 B1
(45) Date of Patent: May 8, 2001

(54) FRICTION WELDED FASTENER PROCESS

(75) Inventors: Douglas J. Waldron, Fountain Valley; Robert Scott Forrest, Santa Ana; Ray F. Toosky, Laguna Niguel, all of CA (US)

(73) Assignee: The Boeing Company, Seattle, WA (US)

( * ) Notice: Subject to any disclaimer, the term of this patent is extended or adjusted under 35 U.S.C. 154(b) by 0 days.

(21) Appl. No.: 09/542,583

(22) Filed: Apr. 4, 2000

(51) Int. Cl.[7] .............................. B23K 20/12; B23K 31/02
(52) U.S. Cl. ................... 228/112.1; 228/139; 228/114.5; 228/120
(58) Field of Search ................... 228/112.1, 2.3, 228/114.5, 120, 139; 411/171; 29/525.01

(56) References Cited

U.S. PATENT DOCUMENTS

| | | |
|---|---|---|
| 2,957,237 | 10/1960 | Regle et al. . |
| 3,477,115 * | 11/1969 | Martin et al. ........................ 29/470.3 |
| 3,481,803 * | 12/1969 | Hewitt ..................................... 156/73 |
| 3,580,793 | 5/1971 | Hewitt . |
| 3,616,980 | 11/1971 | Padilla . |
| 3,848,389 * | 11/1974 | Gapp et al. ........................ 52/758 D |
| 4,676,707 * | 6/1987 | Cearlock et al. ..................... 411/510 |
| 5,230,137 * | 7/1993 | Abe ...................................... 29/525.1 |
| 5,361,478 * | 11/1994 | Grossberndt et al. .............. 29/432.2 |
| 5,713,706 * | 2/1998 | Lozano ................................. 411/171 |
| 6,067,839 * | 9/1998 | Xie ..................................... 72/391.8 |
| 6,095,395 * | 1/2000 | Fix, Jr. ................................... 228/2.3 |

* cited by examiner

Primary Examiner—Patrick Ryan
Assistant Examiner—L. Edmondson
(74) Attorney, Agent, or Firm—Alston & Bird LLP

(57) ABSTRACT

A process for joining two or more overlapping metal workpieces includes providing a fastener which is made of metal having a melting point temperature at least as great as that of the workpieces. The fastener is rotated about its central axis and is axially advanced at a predetermined advance rate into engagement with the workpieces so as to cause plasticization of the workpieces at the interface with the fastener, and to cause the fastener to axially penetrate through substantially the entire thickness of the workpieces. The rotation of the fastener is then stopped, and the plastic zone which surrounds the fastener cools to form a metallurgical bond with the fastener. The resulting fastened joint is mechanically superior to conventional mechanically fastened joints made by rivets and the like.

10 Claims, 1 Drawing Sheet

FRICTION WELDED FASTENER PROCESS

FIELD OF THE INVENTION

The present invention relates to a method of joining workpieces together via a fastener and, more particularly, to a method of forming a lap joint between two or more workpieces by friction welding a fastener through the workpieces.

BACKGROUND OF THE INVENTION

Mechanical fasteners are widely used for joining together two or more metal members. In most applications of mechanical fasteners, holes are formed through the workpieces to be joined, the holes are aligned, and a fastener is passed through the holes and secured. Generally, the fastener has enlarged head portions at each end to prevent the workpieces from being separated, and may also be designed to apply clamping pressure between the head portions so that the workpieces are firmly held together.

This conventional process of joining via mechanical fasteners has a number of disadvantages. For instance, machining the holes for the fasteners results in increased manufacturing cost. Moreover, the head portions of the fasteners represent added weight and cost to the structure being manufactured. For a structure using many such fasteners, the additional weight and cost of the fastener heads can be significant. Additionally, in many cases a sealant must be applied in the holes through which the fasteners extend in order to provide protection against corrosion or to otherwise seal the joints. Furthermore, the holes in the workpieces cause stress concentrations and thereby weaken the structure, so that thicker members and/or higher strength materials must be used in order to meet design safety margins. Thus, the conventional mechanical fastening process leads to increased weight of the final product, and increased cost for manufacturing the product.

SUMMARY OF THE INVENTION

The present invention overcomes the drawbacks of conventional mechanical fastening processes noted above, by providing a process for friction welding a fastener through two or more workpieces so that a metallurgical bond is formed between the workpieces and the fastener. No holes need be formed through the workpieces prior to application of the fastener, thus reducing manufacturing cost and eliminating stress concentrations associated with holes and their attendant disadvantages noted above. Furthermore, the fastener does not require any head portions, thereby reducing weight. Additionally, no sealants are required because the metallurgical bond with the fastener provides sealing and protection against corrosion, further reducing manufacturing cost.

To these ends, the method of the invention is suitable for joining any lap configured structure made up of two or more overlapping metal workpieces which preferably but not necessarily are constructed of the same material or of materials having substantially the same melting point temperature. The method comprises providing a fastener made of metal having a melting point temperature which is at least as great as the melting point temperature of the workpieces; rotating the fastener about its central axis; axially advancing the rotating fastener into engagement with an outer surface of a first of the workpieces; applying axial force between the fastener and the workpieces so as to cause the fastener to advance axially through the overlapping workpieces, the advancing fastener causing frictional heating and plasticization of the metal of the workpieces adjacent the juncture between the fastener and the workpieces; and stopping the rotation of the fastener when the fastener has advanced through substantially the entire thickness of the overlapping workpieces and has plasticized the metal of the workpieces along substantially the entire juncture with the fastener. The plasticized metal forms a metallurgical bond with the fastener. If the fastener has any portions protruding from either side of the joined workpieces, they may be removed by cutting and/or grinding or other process, so that the fastener is flush with the outer surfaces of the joined structure. The result is a fastened joint that is mechanically superior, is faster and less expensive to produce, and is lighter in weight than a conventional mechanically fastened joint.

In one preferred embodiment of the invention, the fastener has a body portion and an enlarged head portion, and the body portion of the fastener is advanced through the workpieces to cause the head portion to contact the outer surface of the first workpiece. Rotation of the fastener and application of force is continued until plasticization of the first workpiece occurs at the juncture with the head portion, such that a metallurgical bond is formed between the head portion and the outer surface of the first workpiece, in addition to the metallurgical bond formed along the length of the body portion of the fastener.

The fastener may be made of the same material as the workpieces, or alternatively may be made of a material having a higher melting point temperature than that of the workpieces. When the fastener and the workpieces are made of the same material, plasticization of metal occurs in both the workpieces and the fastener adjacent the is juncture therebetween. Alternatively, when the fastener is made of a higher-melting metal, plasticization may occur either in both the workpieces and the fastener or in the workpieces alone, depending on the difference in melting points and the amount of frictional heating produced.

BRIEF DESCRIPTION OF THE DRAWINGS

Additional objects, features, and advantages of the invention will become apparent from the following detailed description of specific embodiments thereof, taken in conjunction with the accompanying drawings, in which.

DETAILED DESCRIPTION OF THE DRAWINGS

Figure 1:
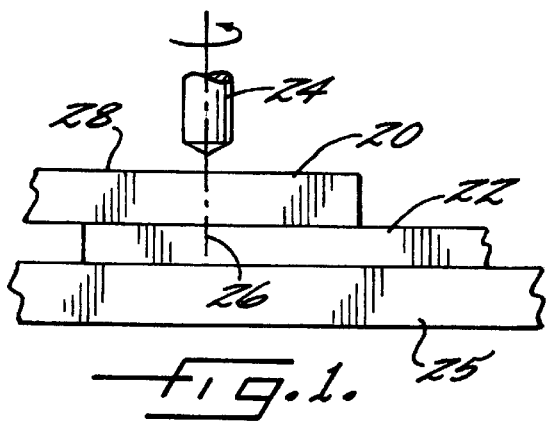
FIG. 1 is a side elevation of a pair of workpieces overlapping to define a lap joint, and showing a fastener positioned prior to being advanced into contact with the workpieces, with the workpieces supported on a backing member.

With reference to FIG. 1, a pair of metal workpieces 20 and 22 which are to be joined are shown in overlapping relation. The workpieces 20 and 22 may be of the same or different metals having the same or differing melting point temperatures, although the process is best suited for joining workpieces having substantially the same melting point temperatures. A metal fastener 24 is disposed above the upper workpiece 20. The fastener 24 advantageously should have a melting point temperature substantially the same or higher than the highest melting point temperature of the workpieces to be joined. The fastener 24 is configured generally as a body of revolution about an axis 26. The size and shape of the fastener 24 may be varied to suit the particular application. The workpieces 20, 22 are supported on a backing member 25 which has sufficient structural strength and rigidity to withstand the forces generated during the friction welding operation without substantially deflecting. For example, the backing member 25 may be a bar or plate of mild steel or tool steel, and may in turn be supported upon a non-yielding support surface.

The fastener 24 is rotated about its central axis 26 at a predetermined rotational rate, which depends on the material and thickness of the workpieces, and the material and diameter of the fastener 24. Generally, for fastening aluminum alloy plates of about 6.4 mm (¼-inch) thickness with a fastener having a nominal diameter of about 3.5 to 15 mm, the fastener 24 will be rotated at an angular rate of from about 1000 to about 10,000 rpm. The fastener 24 is positioned with its axis 26 generally normal to the upper surface 28 of the upper workpiece 20.

Figure 2:
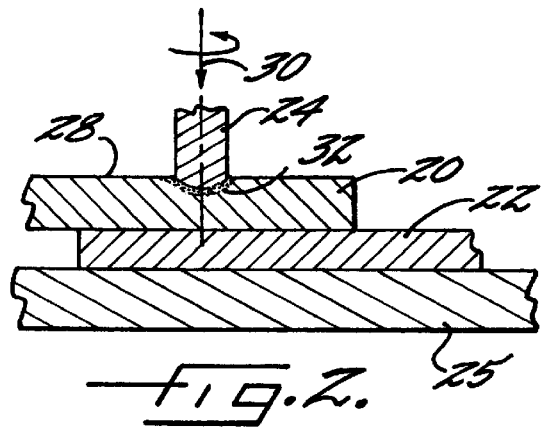
FIG. 2 is a cross-sectional view taken axially through the fastener and the workpieces, showing the fastener rotating and being axially advanced into contact with the upper workpiece to cause plasticization of the workpiece adjacent its upper surface.

As indicated in FIG. 2, the rotating fastener 24 is advanced axially into engagement with the upper workpiece 20, and axial force is applied between the fastener 24 and the workpieces 20, 22, as represented by arrow 30. The rotating fastener 24 causes frictional heating of the upper workpiece 20, with the result that the metal of the upper workpiece 20 becomes plastic beginning in a zone 32 at the upper surface 28.

Figure 3:
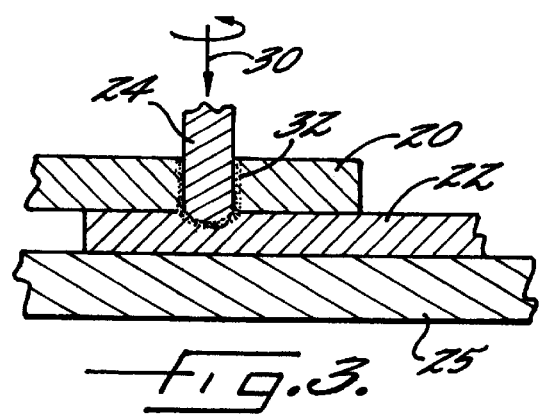
FIG. 3 is a view similar to FIG. 2, showing the rotating fastener further advanced through the upper workpiece and into the lower workpiece.

With reference to FIG. 3, application of axial force is continued to cause the rotating fastener 24 to advance axially at a predetermined rate of advance through the upper workpiece 20 and into the lower workpiece 22. The axial advance rate depends primarily upon the material and thickness of the workpieces 20, 22, and the material and diameter of the fastener 24. Generally, for fastening aluminum alloy plates of about 6.4 mm (¼-inch) thickness, the advance rate is from about 0.2 to about 10 mm per second. As the rotating fastener 24 advances through the workpieces 20, 22, the metal surrounding the fastener 24 is plasticized so that the plastic zone 32 is axially extended completely through the upper workpiece 20 and into the lower workpiece 22.

Figure 4:
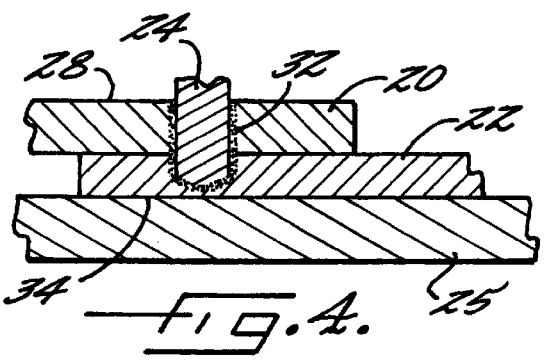
FIG. 4 is a view similar to FIG. 3, showing the rotating fastener still further advanced through the lower workpiece so that the fastener extends substantially through the entire thickness of the overlapping workpieces.

As shown in FIG. 4, the fastener 24 is advanced until it has penetrated through substantially the entire thickness of the lower workpiece 22 and the plastic zone 32 extends substantially to the lower surface 34 thereof. At that time, the rotation of the fastener 24 is stopped. The plastic zone 32 cools to form a metallurgical bond with the fastener 24. If any portion of the fastener 24 extends above the upper surface 28 of upper workpiece 20, the extending portion may be removed flush with the surface 28 by cutting, grinding, or other process. The result is a substantially continuous metal region in each workpiece 20, 22 extending from undisturbed metal of the workpiece outside the weld zone 32, through the weld zone 32, and into the undisturbed metal of the fastener 24. Thus, there are no stress risers giving rise to stress concentrations, and there is no hole requiring sealing. The joint thus produced is therefore mechanically superior to a conventional mechanically fastened joint. Additionally, there are no protruding fastener heads, and hence weight and cost are reduced.

Figure 5:
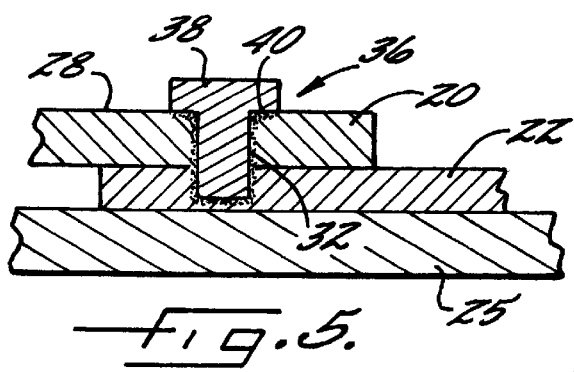
FIG. 5 is a view similar to FIG. 4, showing an alternative construction of a fastener having an enlarged head portion, in which a metallurgical bond is formed at the juncture between the upper surface of the upper workpiece and the head portion.

According to another preferred embodiment of the invention, depicted in FIG. 5, a fastener 36 is provided having an enlarged head portion 38. The fastener 36 is rotated and axially advanced through the workpieces until the head portion 38 contacts the upper surface 28 and causes plasticization of metal at the juncture between the upper surface 28 and the head portion 38, thus producing the additional plastic zone 40 which metallurgically bonds with the head 38 upon cooling and solidification.

Figure 6:
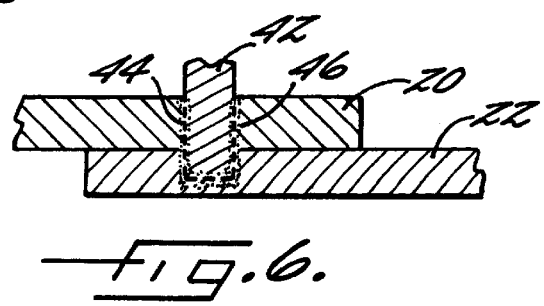
FIG. 6 is a view similar to FIG. 4, but showing the bond that results when both the fastener and the workpieces plasticize at their juncture.

The embodiments described above in connection with FIGS. 1–5 employ a fastener which is made of a metal having a melting point temperature sufficiently higher than that of the workpieces so that only the workpieces are plasticized by the frictional heating created by the rotating and advancing fastener. However, the fastener may alternatively be made of a metal having substantially the same melting point temperature as the workpieces, and indeed may be made of the identical material of the workpieces. In this case, it will be appreciated that both the workpieces and the fastener will undergo plasticization adjacent the juncture therebetween. FIG. 6 depicts the resulting weld between such a fastener 42 and the workpieces. The nominal (i.e., before plasticization) outer surface 44 of the fastener 42 is indicated by dashed lines. As can be seen in FIG. 6, the plastic zone 46 is made up of plasticized metal of both the workpieces 20, 22 as well as the fastener 42, and thus extends across the juncture defined by the nominal surface 44 of the fastener 42.

Various other fastener configurations may be used, depending on the design requirements for the joint. Furthermore, although the description and drawings have illustrated methods for joining two workpieces, it will be appreciated that the invention is not limited to joining two workpieces. Thus, three or more overlapping workpieces may be joined in accordance with the invention. Similarly, although the description has referred to "upper" and "lower" workpieces for clarity of expression, it will be appreciated that the orientation of the workpieces need not be horizontal, and the fastener need not be introduced from above, but may be introduced from below, horizontally from one side or the other, or from any suitable direction, depending on the configuration and accessibility of the structure being formed. Furthermore, although the description has assumed that the backing member and workpieces are held stationary and the fastener is advanced, it will be appreciated that all that is required is relative axial movement between the fastener and the workpieces and backing member, and hence the rotating fastener may be held in a fixed position and the backing member and workpieces may be advanced, or both the fastener and backing member may be advanced toward each other. Moreover, although the description refers to aluminum alloy workpieces, the method of the invention may also be applied to other alloys such as titanium and steel. Accordingly, the invention is not limited to the embodiments described and illustrated, but is to be measured by the scope of the appended claims.

What is claimed is:

1. A method of forming a fastened joint between two or more overlapping metal workpieces, comprising:

providing a fastener made of metal having a melting point temperature at least as great as that of the workpieces, the fastener being configured generally as a body of revolution about a central axis;

rotating the fastener about the central axis thereof;

axially advancing the rotating fastener into engagement with an outer surface of a first of the workpieces;

applying axial force between the rotating fastener and the workpieces so as to cause the rotating fastener to advance axially through the overlapping workpieces, the advancing fastener causing frictional heating and plasticization of the workpieces in a plastic zone adjacent the juncture between the fastener and the workpieces; and stopping the rotation of the fastener when the fastener has advanced sufficiently through the overlapping workpieces to cause the plastic zone to extend substantially through the entire thickness of the overlapping workpieces, the plasticized metal in the plastic zone then cooling to form a metallurgical bond with the fastener.

2. The method of claim 1 wherein the providing step comprises providing a fastener made of the same material as the workpieces, whereby the step of advancing the fastener through the workpieces results in both the workpieces and the fastener becoming plasticized adjacent the juncture therebetween.

3. The method of claim 1 wherein the providing step comprises providing a fastener having a body portion and an enlarged head portion, and wherein the advancing step comprises advancing the body portion of the fastener through the workpieces to cause the head portion to contact the outer surface of the first workpiece, and wherein the rotating and applying steps continue until plasticization of the first workpiece occurs at the juncture between the outer surface and the head portion, such that a metallurgical bond is formed between the head portion and the first workpiece.

4. The method of claim 3 wherein the fastener is made of the same material as the workpieces, and wherein the step of advancing the fastener until the head portion plasticizes the outer surface of the first workpiece also results in plasticization of the head portion adjacent the juncture with the outer surface.

5. The method of claim 1 wherein the step of applying axial force comprises disposing the workpieces between the rotating fastener and a backing member which supports the workpieces, and urging the fastener and the backing member relatively toward each other to cause the fastener to be forced into and to advance axially through the workpieces.

6. A method of fastening together first and second workpieces made of metal, comprising:

positioning a portion of the first workpiece in overlapping relationship with a portion of the second workpiece;

rotating a metal fastener about a central longitudinal axis thereof;

applying axial force between the rotating fastener and the workpieces to cause the fastener to advance axially through the thickness of the overlapping portions of the workpieces by plasticizing the metal of the workpieces adjacent the juncture between the fastener and the workpieces; and stopping rotation of the fastener when the fastener has advanced through substantially the entire thickness of the overlapping portions, the plasticized metal then cooling to form a metallurgical bond between the fastener and the workpieces.

7. The method of claim 6 wherein the rotating step comprises rotating a fastener made of the same material as the workpieces, whereby the step of advancing the fastener through the workpieces results in both the workpieces and the fastener becoming plasticized adjacent the juncture therebetween.

8. The method of claim 6 wherein the rotating step comprises rotating a fastener having a body portion and an enlarged head portion, and wherein the advancing step comprises advancing the body portion of the fastener through the workpieces to cause the head portion to contact an outer surface of the first workpiece, and wherein the rotating and applying steps continue until plasticization of the first workpiece occurs at the juncture between the outer surface and the head portion, such that a metallurgical bond is formed between the head portion and the first workpiece.

9. The method of claim 8 wherein the fastener is made of the same material as the workpieces, and wherein the step of advancing the fastener until the head portion plasticizes the outer surface of the first workpiece also results in plasticization of the head portion adjacent the juncture with the outer surface.

10. The method of claim 6 wherein the step of applying axial force comprises disposing the overlapping portions of the workpieces between the rotating fastener and a backing member which supports the overlapping portions of the workpieces, and urging the fastener and the backing member relatively toward each other to cause the fastener to be forced into and to advance axially through the overlapping portions of the workpieces.

* * * * *

UNITED STATES PATENT AND TRADEMARK OFFICE
CERTIFICATE OF CORRECTION

PATENT NO. : 6,227,433 B1　　　　　　　　　　　　　　　　　　　　Page 1 of 1
DATED : May 8, 2001
INVENTOR(S) : Waldron et al.

It is certified that error appears in the above-identified patent and that said Letters Patent is hereby corrected as shown below:

Title page,
Item [56], References Cited, U.S. PATENT DOCUMENTS,
Line 11, "9/1998" should read -- 5/2000 --;
Line 12, "1/2000" should read -- 8/2000 --; and
insert the following: -- 5,255,485  10/1993  Lemke et al. --.

Signed and Sealed this

Fifth Day of February, 2002

Attest:

Attesting Officer

JAMES E. ROGAN
Director of the United States Patent and Trademark Office